United States Patent [19]

Herr

[11] Patent Number: 4,486,234

[45] Date of Patent: Dec. 4, 1984

[54] FIBER MATERIAL

[76] Inventor: Alfons K. Herr, Ahornweg 3, D-7513 Stutenee-Spöck, Fed. Rep. of Germany

[21] Appl. No.: 358,924

[22] Filed: Mar. 17, 1982

[30] Foreign Application Priority Data

Mar. 20, 1981 [DE] Fed. Rep. of Germany ....... 3110864

[51] Int. Cl.³ .................. C09D 5/16; C04B 31/00; C08K 3/32
[52] U.S. Cl. ................. 106/18.14; 106/163.1; 106/203; 106/288 R; 106/308 B; 106/198; 428/921; 524/417
[58] Field of Search .............. 106/177, 18.14, 203, 106/162, 18.4, 85, 163, 308 B, 288 R; 162/159, 181.2, 80, 100, 181.1, 181.3, 181.4; 8/116 P; 428/921; 524/417

[56] References Cited

U.S. PATENT DOCUMENTS

| 1,643,826 | 9/1927 | Summers | 162/80 |
|---|---|---|---|
| 2,465,645 | 3/1949 | Greger | 106/163 |
| 2,524,783 | 10/1950 | Ford et al. | 8/116 P |
| 2,580,608 | 1/1952 | Schur et al. | 162/181.2 |
| 2,580,611 | 1/1952 | Schur et al. | 162/181.2 |
| 2,610,957 | 9/1952 | Steinman | 524/417 |
| 2,994,620 | 8/1961 | Franck et al. | 162/159 |
| 3,657,065 | 4/1972 | Smith et al. | 162/80 |
| 3,895,997 | 7/1975 | Haywood | 162/100 |
| 3,895,998 | 7/1975 | Haywood et al. | 162/100 |
| 3,999,999 | 12/1976 | Henton | 106/85 |
| 4,311,554 | 1/1982 | Herr | 162/181.2 |
| 4,352,719 | 10/1982 | Herr | 162/181.4 |

FOREIGN PATENT DOCUMENTS 0016836 9/1963 Japan ................... 162/159

OTHER PUBLICATIONS

Chem. Abst.: 80:16701s, Masao Nistlimura, Jul. 1973.

Primary Examiner—Theodore Morris
Attorney, Agent, or Firm—Spencer & Frank

[57] ABSTRACT

Fiber material usable as reinforcement and/or stiffening material in conjunction with the use of an organic or an inorganic binder in the construction industry, comprising organic fibers selected from vegetable fibers, animal fibers, and organic chemical fibers and a tertiary phosphate attached to the organic fibers.

11 Claims, No Drawings

FIBER MATERIAL

BACKGROUND OF THE INVENTION

The present invention relates to a fiber material usable as a reinforcing and/or stiffening material for organic binders and inorganic binders as used in the construction industry, the binders including air-setting binders as well as hydraulic binders, as well as to a process for manufacturing such materials.

In view of the carcinogenity of asbestos fibers, it is an urgent requirement to find a substitute for this fiber. Asbestos, however, has certain well defined properties which are of value for use with inorganic and organic binders and which can be realized with other fiber materials only with difficulty. Since a substitute product must possess the same or at least approximately the same properties and fiber prices play a significant part, the possibilities for solving this problem are rather limited.

Lignified vegetable fibers, wood fibers and cellulose fibers are the only raw materials which replenish themselves and which, in the long run, are available as substitutes. The elastomechanical and physical characteristics of these fibers are also most likely those which would permit their use as a substitute for asbestos fibers.

According to analysis made in the asbestos industry, such a substitute must meet the following requirements: "It must be heat resistant, flexible, spinnable, noncombustible, have insulating properties, can easily be bound in numerous inorganic and organic binders and, depending on its type and species, should have a certain stability." Moreover, a substitute for chrysotile asbestos must be able to bind with cement. Prior attempts to provide such a substitute based on cellulose and glass fibers have not been successful because they resulted in fibers which did not have sufficient strength.

SUMMARY OF THE PRESENT INVENTION

It is therefore an object of the present invention to provide a fiber material which can be used in a manner similar to asbestos fibers, i.e. possesses the above-listed properties.

A further object of the present invention is to provide a process for producing such a fiber.

Additional objects and advantages of the present invention will be set forth in the description which follows and in part will be obvious from the description or can be learned by practice of the invention. The objects and advantages are achieved by means of the products, processes, instrumentalities and combinations particularly pointed out in the appended claims.

To achieve the foregoing objects and in accordance with its purpose, the present invention provides a fiber material as a reinforcement and/or stiffening material for an inorganic binder and an organic binder used in the construction industry, comprising organic fibers selected from vegetable fibers, animal fibers, and organic chemical fibers and a tertiary phosphate attached to the organic fibers.

In contrast to the mineral asbestos fibers which are the only mineral fibers that possess the above-listed properties, the present invention employs organic fibers which, of course, do not and cannot possess characteristics inherent to mineral fibers. Therefore, the organic fibers must be prepared to acquire the characteristics of mineral fibers. This is done, according to the present invention, by attaching tertiary phosphates to the surfaces of the organic fibers, this attaching preferably being effected by encasing the entire fiber by the phosphates. With such encasing, the elasticity inherent in the organic fibers is practically unimpaired. Similarly, the other physical properties which are inherent in organic fibers are practically unimpaired. The organic fibers thus remain flexible and spinnable even after being treated with the phosphate and exhibit approximately the same insulating capability as before.

The present invention further provides a process for preparing the fiber material of the present invention which comprises attaching a tertiary phosphate to organic fibers selected from vegetable fibers, animal fibers and organic chemical fibers. Preferably, the process of the present invention comprises intimately mixing wet organic fibers with a starting mineral which is capable of forming a tertiary phosphate, and adding phosphoric acid to convert the mineral to the tertiary phosphate.

It is to be understood that both the forgoing general description and the following detailed description are exemplary, but are not restrictive of the invention.

DETAILED DESCRIPTION OF THE INVENTION

The fiber material of the present invention comprises organic fibers to which are attached tertiary phosphates. The organic fibers which can be used as starting materials can be any conceivable vegetable fiber, animal fiber or organic chemical (synthetic) fiber. Exemplary of suitable organic chemical fibers are acetate fibers or regenerated cellulose fibers. For economical reasons, it is preferred to use wood and/or cellulose fibers as the organic fibers.

The tertiary phosphates which are attached to the organic fibers in accordance with the present invention preferably are metal phosphates in which the metal has a valence of +2. Such tertiary phosphates correspond to the formula $Me_3(PO_4)_2$ where Me represents a metal such as an alkaline earth metal, and generally contain water of crystallization. Particularly suitable tertiary phosphates are calcium phosphate, tribasic ($Ca_3(PO_4)_2$), magnesium phosphate, tribasic ($Mg_3(PO_4)_2$), and aluminum phosphate ($Al_3(PO_4)_2$).

The attachment of the phosphate to the organic fibers results in fibers which can be incorporated in inorganic binders and which become, in particular, not only heat resistant but also noncombustible. This can be explained by the fact that with the onset of the influence of heat, beginning at about 375° K, the water of crystallization contained in the phosphate evaporates, and this evaporation already protects the organic fiber from to much heat influence. The decisive mechanism for the noncombustibility of the fiber prepared according to the present invention, however, resides in the fact that with further increases in temperature the phosphate melts and the organic fiber is given a dense coating so that it is just able to pyrolize, if at all, and with practically no reduction in strength. The result is a fiber, or fiber material, respectively, which can be used in practice in a manner similar to a material made from the mineral asbestos fiber since it has comparable physical and elastomechanical properties and additionally is not only noncombustible itself, like asbestos, but, due to the energy required to convert the phosphates and due to the discharge of water, contributes to a reduction of the combustion load.

The fiber material according to the present invention is usable, in particular, as a reinforcing and/or stiffening material in conjunction with inorganic binders as used in the construction industry. Thus, the fiber material of the present invention can be incorporated without further measures in air-setting binders as well as in hydraulic binders. Experiments have shown that this is possible with the fiber material according to the present invention since the phosphates do not interfere with the binding mechanism of these construction binders, and intimately bind themselves thereto.

The capability of the phosphates of forming a bond with the binders, and their capability of forming a bond with the organic fibers make the phosphates ideally suited for the present invention.

The fiber materials of the present invention can be formed simply by mixing the organic fibers with already formed tertiary phosphates.

Although simple mixing of already formed tertiary phosphates with the organic fibers leads to a sufficient mechanical bond, the tertiary phosphates are preferably formed in situ on the fibers by adding, according to a preferred embodiment of the present invention, starting materials in two stages. The starting materials are minerals which are capable of forming a tertiary phosphate and phosphoric acid. This two stage addition is done in such a manner that the tertiary phosphates are not added directly to the organic fiber, but that the starting minerals which are capable of forming a tertiary phosphate, such as metal hydroxides, metal hydrogen carbonates or metal carbonates are added to the organic fibers. These starting minerals then form the tertiary phosphate on the fiber when phosphoric acid is added to the fibers. The metal hydroxides, metal hydrogen carbonates and the metal carbonates, which are all basic, very easily bind themselves to the slightly acid organic fibers, i.e. they adhere to the entire surface of the organic fibers. Due to the action of the phosphoric acid, the tertiary phosphates are then formed directly or indirectly. The tertiary phosphates are basic, and thus, the adhesion of the phosphates to the organic fibers is secure.

As already mentioned, any conceivable vegetable fibers can be used as the organic fibers, as well as animal fibers or organic chemical (synthetic) fibers, for example, acetate fibers or regenerated cellulose, and mixtures of fibers. For economical reasons, however, it is preferred to use wood and/or cellulose fibers. For the same reason, it is preferred to use the salts of phosphoric acid (orthophosphoric acid) and particularly the salts of the metal hydroxides of calcium ($Ca(OH_2)$), magnesium ($Mg(OH)_2$) and aluminum ($Al(OH)_3$) as the phosphates. These compounds are available in large quantities and thus are economical, and can also be handled with ease and are noncontaminating.

In accordance with a preferred embodiment for the manufacture of the fiber material according to the present invention, the organic fibers are wet, and the wet organic fibers are intimately mixed with the respective starting minerals, and then phosphoric acid (orthophosphoric acid) is added. By mixing the wet fibers with the starting minerals, the individual fibers are completely encased in these minerals and remain securely adhering thereto since there exists an association between the generally acid fibers and the basic minerals. Wet mixing has the additional result, is free hydroxyl groups are present in the fibers, as is the case with cellulose and hemicellulose, i.e. wood and cellulose fibers, that hydration of the fibers takes place. As a result, the fibers are not only sufficiently moist but also flexible. There additionally result further binding forces in the form of hydrogen bridges between the fibers, the water and the hydroxides, hydrogen carbonates or carbonates. Examinations have indeed shown that the fibers are completely encased by the starting minerals so that after the subsequent addition of phosphoric acid, an almost uninterrupted phosphate sheath results around the individual fibers. In case of fire, this has an advantage that the individual fibers are encased practically completely by a glass-like (ceramic) sheath so that no oxygen can gain access and thus the fiber cannot burn.

Wet mixing can be effected in such a manner that the fibers are mixed with water in a suitable mixer to form a slurry and then the starting minerals in powdered form are added. Instead of adding water, the fibers can also be mixed with the powered starting minerals and then the phosphoric acid, which should be present in a low concentration, can be sprayed in. The resulting mixture in this case is again such that the individual fibers are completely encased by the starting minerals which now are simultaneously converted into phosphates. In many cases, however, the fibers are available already in a wet state, between 15 to 40% particularly if they originate from the fibrous components of clarification sludges. In that case, depending on the degree of wetness of the fibers, no further water need be added.

Preferably, the phosphoric acid is used in concentration of 10% to 50% in the practice of the present invention. If it is present in higher concentrations, a corresponding quantity of water is added to mixture of fibers and minerals before the acid is added.

The fibrous residual components of clarification sludges are a preferred source of suitable organic fibers for use in the present invention since they contain solid substances which are carried along in clarification sludges and which can always be brought to further appropriate use. It is particularly preferred to use residual components of clarification sludges from paper manufacturing plants, since such clarification sludges not only contain the desired organic fibers as a waste product, but also since these organic fibers additionally carry with them minerals which enhance vitrification.

To convert the starting minerals into phosphates, it is preferred to add the phosphoric acid (orthophosphoric acid) in a stoichiometric ratio to the starting minerals so as to obtain a product which has the desired basic pH. (approximately 12)

It has already been mentioned above that lignified vegetable fibers, wood and cellulose are probably the only raw materials which are available in sufficient quantites. Also available in sufficient quantities is lime (calcium), particularly in the minerals limestone, chalk, marble, dolomite gypsum, phosphorite, apatite and fluorite. Wood and cellulose fibers as well as lime are therefore considered to be the most important starting raw materials for the production of the fiber material according to the present invention. Therefore, these two starting materials preferably are used in the implementation of the process according to the present invention or in the manufacture of the fiber material according to the present invention, respectively.

For example, wood fibers can be mixed, at a moisture content of about 40 parts by weight, with calcium hydroxide $Ca(OH)_2$ and phosphoric acid $H_3PO_4$. 3 mols slaked lime then react with 2 mols phosphoric acid to form 1 mol calcium phosphate and 6 mols water.

$$3\,Ca(OH)_2 + 2\,H_3PO_4 \rightarrow Ca_3(PO_4)_2 \cdot 6\,H_2O.$$

The mixing process is exothermal. The pH of the fiber material will then be about 12.0. Hydration of the water activates the free OH groups and the hydration heat heats the mixture. This results in a good bond of the calcium phosphate, created in the mixing and conversion process, on the wood or cellulose fiber. The now mineralized wood fiber, which in composition has become related in species to cement, enters a bond with cement if it is used to reinforce cement. A mixture of the fiber material according to the present invention and cement is better and more uniform than a mixture of cement with asbestos fibers. This has been demonstrated in a comparison between cement plates formed with asbestos fiber reinforcements and cement plates formed with fire protection reinforcements according to the process of the present invention. The heat resistance of the fire protection fiber must be considered in connection with the intended use. This property is obtained by the good heat insulating properties of the wood fiber in conjunction with the mineralization and the fire protection. Flexibility and spinnability are determined by the fiber length, the ratio of its length to its density and by the fineness of the fiber. This characteristic is variable and can be influenced by selection of the raw fiber material.

The fiber materials according to the present invention are economical since they can at least be produced for the same price as chrysotile asbestos, No. 7 fiber, which is the most economical asbestos fiber for use with construction materials.

As already mentioned, fiber materials from residual water clarification sludges originating from paper manufacturing plants can be used to advantage. They comprise mainly finely ground, narrow, and elastic cellulose fibers to which adhere waste materials such as kaolin, titanium dioxide etc. which are of value of this type of use. The use of this fiber raw material for the wood chip industry has been found acceptable already through long years of industrial use. The use of cellulose fibers in the practice of the present invention may also be of advantage for the production of certain end products. For the construction plate industry, however, the use of a mixture of coarse wood chips is of advantage so as to realize high bending and transverse strengths (shearing strength) and high moduli of elasticity in the reinforced cement mixture.

The quantitative composition in the fiber material of the present invention of the organic fiber and fire protection component or of the mineralization component is variable. However, the stoichiometric quantity ratio should be maintained between the mineral and the acid. Deviations from the use of stoichiometric quantities of mineral and acid should be used only when it is desired to realize a form 7 different pH. A different pH may be of disadvantage in certain applications. For use as a reinforcing material in cement plates, a pH of about 12.0 is set.

Since the fiber material according to the present invention protects and reinforces the plates or objects provided therewith in the case of fire, the fiber material can therefore also be used as a fire protection agent. This latter term is being used in the examples that follow.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates individual material components for producing a fire protection fiber in accordance with the present invention as an armor material for noncombustible cement construction board. The following materials were mixed together to provide fire protection fibers:

| | |
|---|---|
| 27.5 parts by weight | fiber material (dried) |
| 50.5 parts by weight | Ca(OH)$_2$ (slaked lime) |
| 22.5 parts by weight | H$_3$PO$_4$ (phosphoric acid), 100% |
| 100.0 parts by weight | fire protection fibers. |

EXAMPLE 2

This example illustrates the manufacture of fire protection fibers in accordance with the present invention.

100 parts by weight wood fiber mixture having a moisture content of 60% are fed into a turbulence mixer and then 200 parts by weight calcium hydroxide, Ca(OH)$_2$ are added. (The 100 parts by weight wood fiber mixture resulted from dehydrating a wood fiber mixture containing 275 parts by weight). The wood fiber mixture and calcium hydroxide are mixed and homogenized for about 1 to 2 minutes. Then, 144 parts by weight H$_3$PO$_4$ (100%), i.e. for example 288 g H$_3$PO$_4$ (50%), are sprayed in with the mixer running. The spray-in period lasts for about 5 minutes. The conversion process is exothermal. After removing the fire protection fibers from the mixer, the fibers are permitted to ripen and release steam for a few minutes. The fiber material is now in a processable state and is used directly for mixing with cement according to conventional methods.

If a dry fiber is to be produced, the fiber material, after removal from the mixer, is dried to the desired degree of dryness, which can be effected, for example, in a moving bed dryer. In their dry state, the fibers can be treated further and sorted.

Additives can be incorporated in the fiber material. Exemplary additives which can be used are setting accelerators, or setting inhibitors for the purpose of generating hydrophobia, or additives for obtaining other material properties, or additives to add color. These additives can be added to the organic fibers in the wet state, or can be added in the dry state.

EXAMPLE 3

110 parts by weight dried of residual waste water clarification sludge from a fine paper manufacturing plant and having a residual moisture content, resulting from dehydration, of 60 percent by weight, and 200 parts by weight calcium hydroxide are mixed in a turbulence mixer and homogenized. (The sludge before dehydration contained 314 parts by weight). Thereafter, 208 parts by weight of 69% phosphoric acid are sprayed in and the process continues as in Example 2.

EXAMPLE 4

165 parts by weight of finely ground wood or cellulose fibers having a moisture content of 15 parts by weight are fed into a turbulence mixer and intimately mixed with 200 parts by weight calcium carbonate. Thereafter, 416 parts by weight of 34% phosphoric acid are sprayed in and the process continues as in Example 2.

EXAMPLE 5

For the purpose of a comparative test of various important physical properties, cement plates were produced with the same composition and under the same processing conditions, once reinforced with asbestos fibers and once with the fiber material according to the present invention.

Plate size:
400×400 mm,
Plate thickness 17.0 to 19.05 mm
Composition
20 parts by weight fiber material
80 parts by weight cement The hardening time for both types of plates was about 36 hours, without the use of a setting accelerator, at room temperature of 30° to 35° C. Setting took place without pressure.

Physical characteristics

The plates made with asbestos had a specific weight of 850 to 900 kg/m$^3$. The plates made with the fiber material according to the present invention had a specific weight of 900 to 950 kg/m$^3$.

The measured bending strength was 2.0 M/mm$^2$ for both plates. The shearing strength was 0.92 N/mm$^2$ for the plates made with asbestos and 1.04 N/mm$^2$ for the plates made with the fiber material according to the invention.

The increase in thickness due to swelling was 0.5% for the asbestos plate after 2 hours and 0.88% after 24 hours. In comparison, the increase in thickness due to swelling was significantly improved for the fiber plates made with the fiber material according to the present invention, that is, there was less swelling for the fiber plates made in accordance with the present invention. Thus, after 2 hours and after 24 hours, the swelling was a maxium of 0.25% for the fiber plates made in accordance with the present invention. The water absorption was also improved in the plates employing these fibers materials. Water absorption was 80.5% after 2 hours and 85.1% after 24 hours for the asbestos fiber plates. In comparison, water absorption was 55.1% after 2 hours and 58.7% after 24 hours for the fiber materials according to the present invention.

The physical values set forth above constitute a cross section of groups of 10 sample bodies. Both types of plates were tested for combustibility pursuant to DIN 4102. They both pass the test of Class A 2 (noncombustible).

It will be understood that the above description of the present invention is susceptible to various modifications, changes and adaptations, and the same are intended to be comprehended within the meaning and range of equivalents of the appended claims.

What is claimed is:

1. Fiber material usuable as reinforcement and/or stiffening material for an organic or inorganic binder used in the construction industry, comprising organic fibers selected from vegetable fibers, animal fibers, and organic chemical fibers and a tertiary phosphate attached to the organic fibers, wherein the phosphate is formed by the reaction of phosphoric acid (orthophosphoric acid) with a metal hydrogen carbonate or metal carbonate.

2. Fiber material as defined in claim 1, wherein the organic fibers are lignified vegetable fibers.

3. Fiber material as defined in claim 1, wherein the organic fibers are wood fibers.

4. Fiber material as defined in claim 1, wherein the organic fibers are cellulose fibers.

5. Fiber material as defined in claim 1,2,3 or 4, wherein the phosphate encases the fibers.

6. Process for producing a fiber material comprised of organic fibers selected from vegetable fibers, animal fibers and organic chemical fibers, comprising intimately mixing the organic fibers with a starting mineral which is a metal hydrogen carbonate or metal carbonate capable of forming a tertiary phosphate, and adding phosphoric acid (orthophosphoric acid) to form the tertiary phosphate.

7. Process as defined in claim 6, wherein the fibers are the fibrous components of clarification sludges.

8. Process as defined in claim 7, wherein the fibers are the fibrous residual components of clarification sludges from paper manufacturing plants.

9. Process as defined in claim 6, wherein the phosphoric acid (orthophosphoric acid) is added to the starting mineral in a stoichiometric ratio.

10. Process as defined in claim 6, wherein the phosphoric acid is added after the mixing.

11. Process as defined in claim 6, wherein the phosphoric acid is added simultaneously with the mixing.

* * * * *